United States Patent
Yew et al.

(10) Patent No.: US 7,551,586 B1
(45) Date of Patent: Jun. 23, 2009

(54) METHOD AND SYSTEM FOR DATA RATE BASED VERTICAL HANDOFF

(75) Inventors: Meng Y. Yew, Olathe, KS (US); Hector M. Ribas, Overland Park, KS (US); Jason P. Sigg, Olathe, KS (US); Abhijit V. Apte, Overland Park, KS (US); Nandish M. Chalishazar, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 775 days.

(21) Appl. No.: 11/091,299

(22) Filed: Mar. 28, 2005

(51) Int. Cl.
*H04W 4/00* (2009.01)
*H04B 7/216* (2006.01)
*H04M 1/00* (2006.01)
*H04W 36/00* (2009.01)

(52) U.S. Cl. .................... 370/332; 370/335; 455/552.1; 455/553.1; 455/436

(58) Field of Classification Search ............... 455/552.1, 455/553.1, 452.1, 452.2, 436, 437, 443, 444; 370/332, 335, 342
See application file for complete search history.

(56) References Cited

U.S. PATENT DOCUMENTS 6,728,217 B1 *  4/2004 Amirijoo et al. ............ 370/252
6,738,373 B2 *  5/2004 Turner ........................ 370/352
2005/0201382 A1   9/2005 Xue et al.
2005/0265236 A1 * 12/2005 Kwon et al. ................. 370/235

OTHER PUBLICATIONS

McNair et al., "Vertical Handoffs in Fourth-Generation Multinetwork Environments," *IEEE Wireless Communications*, pp. 8-15 (2004).
Cheng Wei Lee et al., "A Framework of Handoffs in Wireless Overlay Networks Based on Mobile IPv6," IEEE Journal on Selected Areas in Communications, vol. 23, No. 11, Nov. 2005.
A. Ezzouhairi et al., "A Fuzzy Decision Making Strategy for Vertical Handoffs," CCECE/CCGEI, May 2008.

* cited by examiner

*Primary Examiner*—George Eng
*Assistant Examiner*—Un C Cho

(57) ABSTRACT

A method and system for using data rate as a basis to allow or deny handoff from an IS-856 (e.g., EV-DO) communication system to an IS-2000 (e.g., 1xRTT) communication system. A base station detects that a hybrid terminal has received a threshold low forward link IS-856 data rate for a threshold time period, and the base station will responsively evaluate the IS-2000 system to determine if the IS-2000 system has sufficient resources to provide at least as good a data rate as the IS-856 threshold data rate. If the base station thereby determines that the IS-2000 system is a good alternative, then the base station will allow a handoff to occur when the terminal seeks to handoff to IS-2000. On the other hand, if the base station thereby determines that the IS-2000 system is not a good alternative, then the base station will not allow the handoff to IS-2000.

17 Claims, 3 Drawing Sheets

METHOD AND SYSTEM FOR DATA RATE BASED VERTICAL HANDOFF

FIELD OF THE INVENTION

The present invention relates to wireless communications and, more particularly, to vertical handoff of data communication sessions, i.e., handoff of data sessions from one air-interface protocol to another air-interface protocol. The invention is particularly useful to facilitate handoff of an active data session from an IS-856 (e.g., EV-DO) wireless coverage area to an IS-2000 (e.g., 1xRTT) wireless coverage area, but the invention may extend to other vertical handoff scenarios as well.

BACKGROUND

In a typical cellular radio communications system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) or packet data serving node (PDSN) for instance. The switch or gateway may then be coupled with a transport network, such as the PSTN or a packet-switched network (e.g., the Internet).

When a mobile station (such as a cellular telephone, pager, or appropriately equipped portable computer, for instance) is positioned in a cell, the mobile station communicates via an RF air interface with the BTS antenna of the cell. Consequently, a communication path is established between the mobile station and the transport network, via the air interface, the BTS, the BSC and the switch or gateway.

With the explosive growth in demand for wireless communications, the level of call traffic in most cell sites has increased drastically over recent years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instance, a mobile station in a wireless network will typically be positioned in a given physical sector and will be able to communicate with the transport network via the BTS serving that physical sector.

As a mobile station moves between coverage areas, such as sectors, of a wireless communication system, or when network conditions change or for other reasons, the mobile station may "hand off" from operating in one coverage area to operating in another coverage area. In a usual case, this handoff process is triggered by the mobile station monitoring the signal strength of signals that it is receiving in various available coverage areas, and the mobile station or the BSC determining when one or more threshold criteria are met. For instance, the mobile station may monitor signal strength in various available coverage areas and notify the BSC when a given coverage area has a signal strength that is sufficiently higher than the coverage area in which the mobile station is currently operating. The BSC may then direct the mobile station to hand off to that other coverage area.

In some cases, more than one air interface communication protocol might be implemented in a given market area. For instance, as will be described more below, a given market area might provide both legacy CDMA coverage under a standard protocol such as EIA/TIA/IS-2000 Rel. 0, A or other version thereof (hereafter "IS-2000") and also high data rate coverage according to a standard protocol such EIA/TIA/IS-856 Rel. 0, A, or other version thereof (hereafter "IS-856"). In such a system, a mobile station might not only hand off between coverage areas under a common air interface protocol (e.g., between IS-2000 sectors) but may also hand off between the different air interface protocols, such as between IS-2000 and IS-856. Handoff between different air interface protocols (or, more generally, between different access technologies) is known as "vertical" handoff.

To facilitate vertical handoff, a mobile station operating under a given air interface protocol might be arranged to periodically check for availability of service under another air interface protocol. By way of example, a mobile station operating under IS-856 might periodically check for availability of IS-2000 service. Further, when the signal strength of the available IS-2000 service is sufficiently higher than the signal strength of the existing IS-856 service, the mobile station may hand off from the IS-856 system to the IS-2000 system, typically with approval from the BSC.

SUMMARY

In a conventional dual-protocol or "hybrid" system, as described above, signal strength is used as the basis to trigger vertical. A problem with using just signal strength to trigger such handoff, however, is that signal strength is not necessarily determinative of how well a given system will perform, or how well the system will perform compared to other systems. It is possible in some cases, for instance, that a mobile station may be receiving a sufficiently high signal strength to justify handoff from a first protocol to a second protocol but that the mobile station might actually be able to communicate at a higher data rate under the first protocol than under the second protocol.

The present invention advances over the state of the art by using data rate (possibly among one or more other parameters) as a basis to allow or deny a vertical handoff from one air interface protocol to another.

According to an exemplary embodiment of the invention, a base station in a hybrid system will detect that a mobile station has received a threshold low forward link data rate under a first protocol for a threshold time period. In response, the base station will then determine whether the system has sufficient resources to provide at least as good of a data rate under a second protocol as the mobile station is getting under the first protocol.

If the base station thereby determines that the second protocol is a good alternative, then (assuming any other conditions are met) the base station will allow a handoff to occur when the mobile station seeks to hand off to the second protocol. On the other hand, if the base station determines that the second protocol is not a good alternative (i.e., that the system cannot support at least the same data rate under the second protocol that the system is currently providing under the first protocol), then the base station will not allow the handoff to the second protocol.

Using IS-856 and IS-2000 as an example of the first and second protocols respectively, a base station carrying out the exemplary embodiment would thus determine first that a mobile station is receiving a particular forward link data rate under IS-856 for a threshold period. The base station would then determine whether sufficient resources exist to provide the mobile station with at least as good a data rate under IS-2000. If so, then the base station will allow the mobile station to handoff from IS-856 to IS-2000 when the mobile station request such a handoff. Otherwise, the base station will deny the requested handoff.

These and other aspects, advantages, and alternatives will become more apparent to those of ordinary skill in the art by reading the following detailed description, with reference where appropriate to the accompanying drawings. Further, it should be understood that this summary and other descriptions throughout this document are intended to explain the invention by way of example only and are not intended to restrict the scope of the invention as claimed. For instance, structural elements and process steps can be rearranged, combined, distributed, eliminated, or otherwise changed, while remaining within the scope of the invention as claimed.

DETAILED DESCRIPTION

The present invention will be described by way of example with reference to hybrid IS-2000/IS-856 communications. It should be understood, however, that the invention can extend to apply in other hybrid systems as well, such as with respect to other air interface protocols for instance.

1. CELLULAR WIRELESS PACKET DATA COMMUNICATIONS

Figure 1:
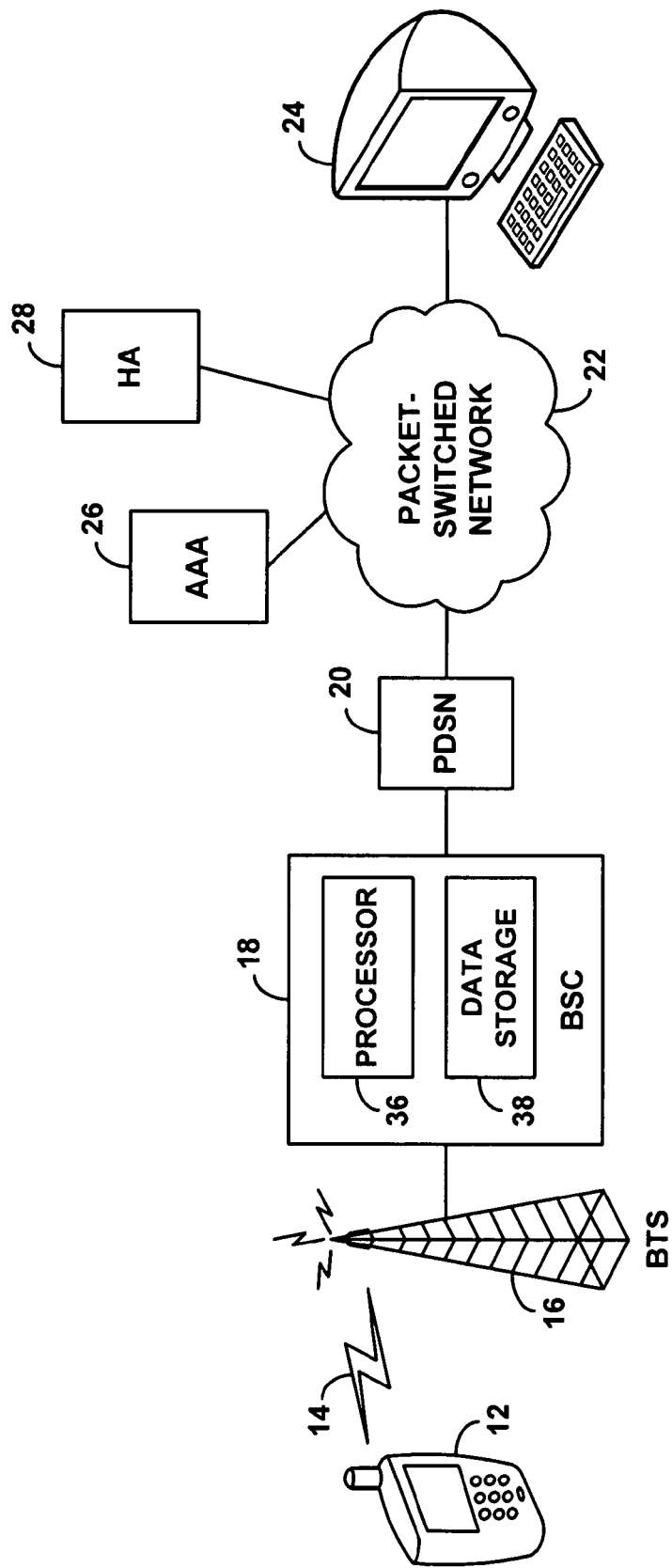
FIG. 1 is a simplified block diagram of a wireless communication system in which an exemplary embodiment of the invention can be implemented.

FIG. 1 depicts an example cellular wireless communication system adapted to provide wireless packet data communication service for a mobile station 12. Mobile station 12 communicates over an air interface 14 with a BTS 16, which is then coupled or integrated with a BSC 18. BSC 18 is then coupled with a PDSN 20, which provides connectivity with a packet-switched network 22 such as the Internet and/or a wireless carrier's private core packet-network. Sitting as nodes on network 22 are, by way of example, a remote computer 24, an authentication, authorization, and accounting (AAA) server 26, and a mobile-IP home agent (HA) 28.

With this arrangement, after being authenticated by AAA server 26, HA 28 may assign an IP address for use by mobile station 12, and mobile station 12 may then engage in packet-data communications with entities such as remote computer 24, via a communication path comprising air interface 14, BTS 16, BSC 18, PDSN 20, and network 22.

Figure 2:
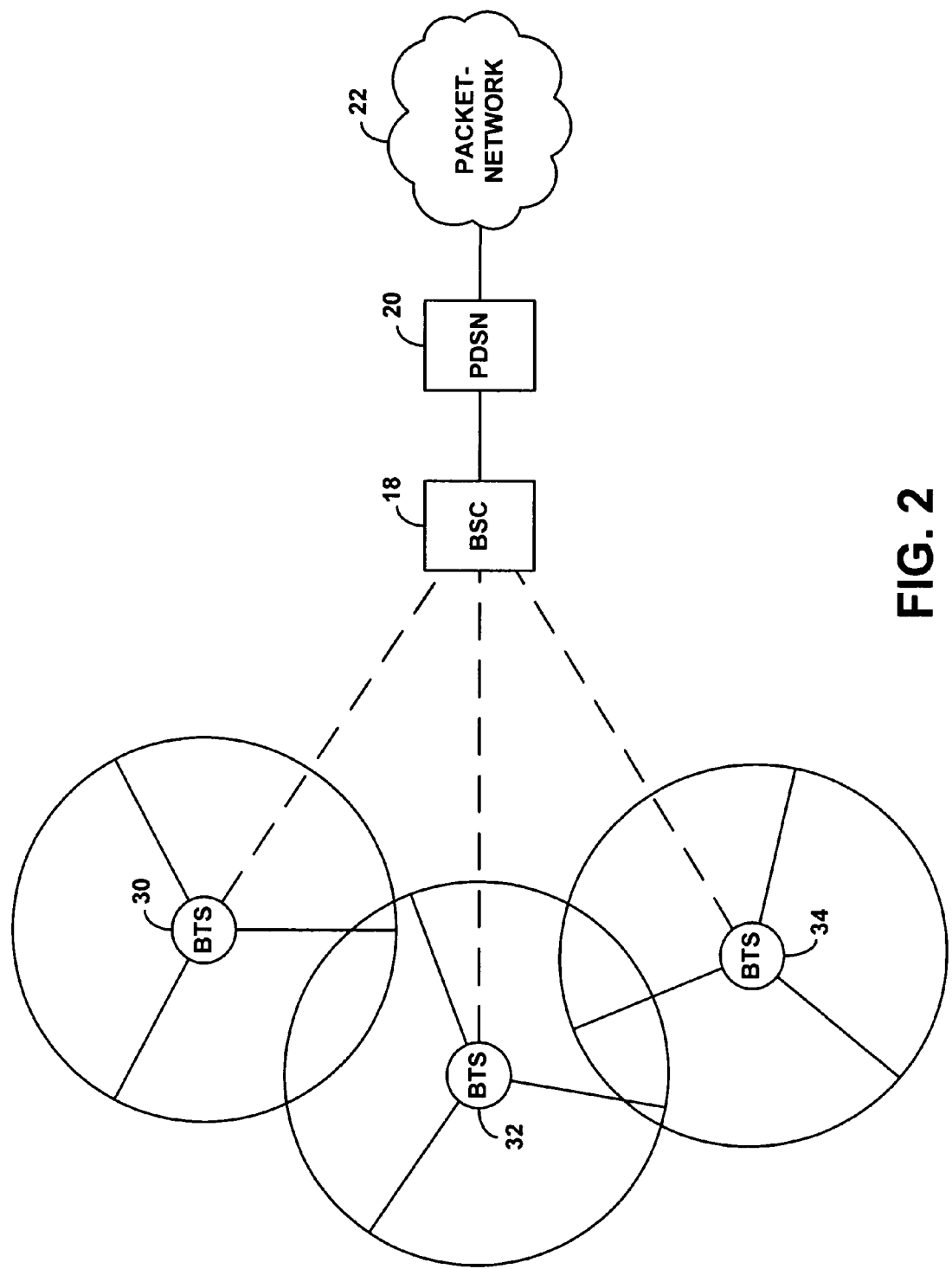
FIG. 2 is another simplified block diagram of a wireless communication system in which the exemplary embodiment can be employed.

In practice, BSC 18 may serve multiple BTSs. Each BTS may then radiate to define a given cell and a plurality of cell sectors. FIG. 2 illustrates this arrangement. As shown in FIG. 2, BSC 18 is coupled with three BTSs 30, 32, 34. Each BTS is shown at the core of a respective circle representing a cell, and each cell is divided into three pie-pieces representing sectors. With this arrangement, a mobile station can operate in any of the sectors and can communicate on packet network 22 via its serving BTS, and via BSC 18 and PDSN 20.

Throughout this description, the term "base station" will refer to a radio access network element such as a BTS, a BSC, or combination BTS/BSC, for instance. A base station may include other elements and may take other forms as well. The term "radio network controller" (RNC) may also be used to refer to a BSC or more generally to a base station, usually in the context of IS-856 communications.

Preferably, the invention will be carried out by a base station, such as by BSC 18 for instance. In this regard, FIG. 1 shows that BSC 18 includes a processor 36 and data storage 38. Processor 36 may comprise one or more general purpose processors (e.g., microprocessors) and/or one or more dedicated, special-purpose processors (e.g., DSP chips, or the like). Data storage 38, in turn, may comprise one or more volatile and/or non-volatile data storage components (e.g., magnetic, optical, and/or organic storage) and may be integrated or connected with processor 36. As further shown, data storage 38 preferably contains program instructions 40 that define one or more routines executable by processor 36 to carry out various functions described herein. (As such, the processor, data storage, and/or instructions may be considered to define means for carrying out the various functions.)

2. LEGACY CDMA COMMUNICATIONS

In a conventional or "legacy" Code Division Multiple Access ("CDMA") wireless network compliant with the well known industry standards TIA/EIA/IS-95 and TIA/EIA/IS-2000, each cell employs one or more carrier frequencies, typically 1.25 MHz each, and each sector is distinguished from adjacent sectors by a pseudo-random number offset ("PN offset"). Further, each sector can concurrently communicate on multiple different channels, distinguished by "Walsh codes". When a mobile station operates in a given sector, communications between the mobile station and the BTS of the sector are carried on a given frequency and are encoded by the sector's PN offset and a given Walsh code.

Air interface communications are divided into forward link communications, which are those passing from the base station to the mobile station, and reverse link communications, which are those passing from the mobile station to the base station. In an IS-95 or IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

With this arrangement, a mobile station can be arranged to engage in packet-data communications. To do so, the mobile station first sends a packet-data origination request over the access channel and via the BTS 16 and BSC 18 to an MSC (not shown). The MSC then signals back to the BSC directing the BSC to assign an air interface traffic channel for use by the mobile station, and the BSC signals to the PDSN 20. The PDSN 20 and mobile station 12 then negotiate to establish a data link layer connection, such as a point to point protocol (PPP) session. Further, the PDSN 20 sends a foreign agent challenge message to the mobile station, and the mobile station responds with a mobile-IP registration request (MIP RRQ), which the PDSN forwards to HA 28. The HA then assigns an IP address for the mobile station to use, and the PDSN passes that IP address via the BSC to the mobile station.

Once the mobile station has a radio link (an assigned traffic channel), a data link, and an IP address, the mobile station is considered to be in an "active" mode. To conserve air interface resources, however, an IS-2000 system is typically arranged to release the mobile station's assigned traffic channel after a certain amount of time during which no data traffic passes to or from the mobile station through the PDSN. Upon release of the mobile station's radio link, the mobile station is considered to be in a "dormant" mode, in which it lacks a radio link but still has a data link and an IP address.

While in the dormant mode, if the mobile station seeks to transmit packet-data from its IP address, the mobile station would re-acquire a radio link by sending a new origination request message to the BSC. Similarly, if the PDSN receives packet-data destined for the IP address of a dormant mobile station, the PDSN would notify the BSC, the BSC would page the mobile station to cause the mobile station to then re-acquire a radio link, and the PDSN would then pass the data along to the mobile station.

Under IS-95 and IS-2000, a mobile station can communicate with a number of "active" sectors at a time. (The term "active" in this context should not be confused with the same term used to describe data communication state as noted above.) Depending on the system, the number of active sectors can be up to three or six (currently). The mobile station receives largely the same signal from each of the active sectors and, on a frame-by-frame basis, selects the best signal to use.

A mobile station maintains in its memory a list of the sectors in its "active" set. In addition, it maintains in its memory a list of "candidate" sectors (typically up to six), which are those sectors that are not yet in the active set but that have sufficient signal strength that the mobile station could demodulate signals from those sectors. Further, the mobile maintains a list of "neighbor" sectors, which are those sectors not in the active set or candidate set but are in close vicinity to the mobile station. All other possible sectors are members of a "remaining" set.

To facilitate a determination of which sectors should be in the mobile station's "active" set, all base stations emit a pilot channel signal in each sector, typically at a power level higher than other forward link signals. A mobile station then constantly measures the strength of each pilot that it receives and notifies a primary base station (a base station currently serving the mobile station) when pilot strength falls above or below designated thresholds. The base station, in turn, provides the mobile station with an updated list of active pilots.

More particularly, in legacy systems, the base station initially provides the mobile station with a Handoff Direction Message (HDM), which indicates (i) the PN offsets of the sectors in the active set and (ii) various handoff parameters that relate to pilot signal strength. Additionally, the base station initially provides the mobile station with a Neighbor List Update Message (NLUM), which identifies the "neighbor" sectors for the current active set.

The mobile station then monitors all of the pilot signals that it receives, and the mobile station determines if any neighbor pilot exceeds a designated threshold strength. If so, the mobile station adds the pilot to its "candidate" set and sends a Pilot Strength Measurement Message (PSMM) to the base station, indicating the estimated $E_c/I_o$ for the pilot. Depending on current capacity and other issues, the base station may then send an HDM to the mobile station, listing the pilot as a new member of the active set. Upon receipt of the HDM, the mobile station then adds the pilot to its active set as instructed, and the mobile station sends a Handoff Completion Message (HCM) to the base station, acknowledging the instruction, and providing a list of the pilots (PN offsets) in its active set.

Similarly, if the mobile station detects that the signal strength of a pilot in its active set drops below a designated threshold, the mobile station starts a handoff drop timer. If the timer expires, the mobile station then sends a PSMM to the base station, indicating the $E_c/I_o$ and drop timer. The base station may then respond by sending an HDM to the mobile station, without the pilot in the active set. The mobile station would then receive the HDM and responsively move the pilot to its neighbor set and send an HCM to the base station.

3. HIGH RATE PACKET-DATA COMMUNICATIONS

Under IS-2000, the highest rate of packet-data communications theoretically available on a fundamental traffic channel of the forward link is 9.6 kbps (under "Radio Configuration 3" (RC3), which provides 64 Walsh codes per sector) or 19.2 kbps (under RC4, which provides 128 Walsh codes per sector). In order to provide higher rate packet-data service to support higher bandwidth applications, the industry has introduced a new "high rate packet data (HRPD) system," which is defined by industry standard IS-856.

IS-856 leverages the asymmetric characteristics of most IP traffic, in which the forward link typically carries a heavier load than the reverse link. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a "data rate control" (DRC) channel used to indicate the supportable data rate and best serving sector for the forward link. The end result is that a mobile station operating under IS-856 can, in theory, receive packet-data at a rate of at least 38.4 kbps and up to 2.4 Mbps.

The IS-856 forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. As in IS-2000, each sector in IS-856 is defined by a PN offset, and the pilot channel carries an indication of the sector's PN offset. Also as in IS-2000, a mobile station operating under IS-856 monitors the pilot signal emitted by various sectors as a basis to facilitate active set management, i.e., to facilitate handoff from one sector to another.

IS-856 introduces a "virtual soft handoff" concept, in which a mobile station communicates with the network on just a "best" sector of its active set at any given time. As in IS-2000, the mobile station monitors the signal strength of pilot signals emitted by various sectors, and the mobile station uses threshold handoff parameters such as those noted above as a basis to trigger the addition of a sector to the mobile station's candidate set. Further as in IS-2000, the mobile station then sends a revised candidate set to the network, and the network decides whether to revise the mobile station's active set. If the network decides to update the mobile station's active set, the network sends an HDM to the mobile station and further instructs each sector to communicate with the mobile station.

Unlike IS-2000 in which forward traffic information is routed to all sectors in the mobile station's active set, however, forward traffic under IS-856 is routed to only a "best" sector that the mobile station selects from its active set, typically the sector that has the strongest pilot signal (or, more particularly, the highest signal to noise ratio (C/I)). In practice, the mobile station will monitor the pilot signals of the sectors in its active set, and will include in its DRC (on the reverse link) an indication of the selected serving sector. Only that sector will then serve the mobile station with forward link packets. Thus, a mobile station may quickly hand off from one IS-856 serving sector to another by simply instructing the base station which sector it intends to communicate with.

Further, the mobile station will select a data rate based on the C/I that it measures for the selected sector, and the mobile station will include in its DRC a request to receive forward link communications at that data rate. According to IS-856, the higher the C/I, the higher the requested data rate, and the lower the C/I, the lower the requested data rate.

Upon receipt of the DRC from the mobile station, the base station will decide whether or not it will grant the mobile station's requested forward link data rate. In this regard, the base station will apply a scheduling algorithm to determine which requests to grant and which requests to deny. The scheduling algorithm is vendor-specific and can therefore take various forms. By way of example, one scheduling algorithm may provide for granting the best data rate requested by mobile stations currently requesting data rate. Another scheduling algorithm (the "proportional fairness algorithm") provides for the base station maintaining an average data rate provided to a mobile station over time, and granting a request to the mobile station for which the difference between its requested data rate and its average data rate is the greatest. Other examples are possible as well. If the base station decides to grant the request, the base station will then deliver data to the mobile station at the requested rate (although, in some cases, the actually delivered forward link data rate may differ from the rate requested and granted).

To acquire packet data connectivity under IS-856, after a mobile station first detects an IS-856 carrier, the mobile station sends to its BSC (or "RNC") 18 a UATI (Universal Access Terminal Identifier) request, and receives in response an International Mobile Station Identifier (IMSI), which the mobile station can then use to identify itself in subsequent communications with the BSC. The mobile station then sends a connection-request to the BSC 18, and the BSC responsively invokes a process to authenticate the mobile station and to have the mobile station acquire a data link.

In particular, the BSC 18 sends an access request to an Access Network AAA (ANAAA) server (which may be different than the AAA server 26 shown in FIG. 1), and the ANAAA server authenticates the mobile station. The BSC 18 then assigns radio resources for the data session, by directing the mobile station to operate on a particular time slot traffic channel on the forward link and a particular Walsh coded traffic channel on the reverse link. Further, the BSC signals to the PDSN 20, and the PDSN and mobile station then negotiate to establish a PPP data link. In addition, as in the IS-2000 process, the mobile station then sends an MIP RRQ to the PDSN, which the PDSN forwards to the HA 28, and the HA assigns a mobile-IP address for the mobile station to use.

As in IS-2000, once the mobile station has acquired an IS-856 radio link, a data link, and an IP address, the mobile station is considered to be in an active mode. In the active mode, the mobile station is given full use of the sector power in its assigned time slot, i.e., each time its time slot occurs, which facilitates higher rate data communication. Further, as in IS-2000, if the mobile station does not send or receive data for a defined period of time, the mobile station enters a dormant mode. In the dormant mode, an IS-856 system maintains the logical state of the mobile station's session (e.g., IP address, PPP state, and radio link session information), while releasing the mobile station's radio link resources (e.g., the time slot that had been assigned for use by the mobile station). With the maintained session state, the mobile station can quickly re-acquire a radio link so as to send or receive packet data, thereby giving the appearance that the mobile station is "always on."

4. HYBRID IS-2000/IS-856 SYSTEMS

Given the proliferation of legacy IS-2000 systems, IS-856 was designed to be backwards compatible and to facilitate "hybrid" operation. A "hybrid access terminal," in this scenario, is defined as a mobile station that can operate on both IS-2000 and IS-856 networks. A typical hybrid terminal, for instance, may be capable of receiving voice, short message service (SMS) messages, and dedicated channel data services on IS-2000 networks, as well as high-speed packet data service on IS-856 networks.

In a hybrid system, IS-2000 and IS-856 coverage are provided on different carrier frequencies, each of which is 1.25 MHz in bandwidth for consistency with legacy operation. Further, most IS-856 systems are provided as overlays on existing IS-2000 systems, such that a given BSC provides either IS-2000 coverage or both IS-2000 and IS-856 coverage. For an IS-2000 sector, the BSC may have just an IS-2000 circuit card. For a hybrid IS-2000/IS-856 sector, on the other hand, the BSC may have both an IS-2000 circuit card to facilitate IS-2000 operation and an IS-856 circuit card to facilitate IS-856 operation. A typical hybrid device will be programmed to use an IS-856 data connection when faced with the choice between IS-856 and IS-2000, i.e., when in a hybrid sector.

By standard design, when a hybrid terminal is operating in an IS-856 system, it will also periodically monitor the control channels in the IS-2000 system, in search of any incoming voice calls, SMS messages, or the like, and to monitor IS-2000 pilot signals. In the active IS-856 mode, the terminal periodically (e.g., every 5 seconds) tunes to the frequency of the IS-2000 system to monitor the IS-2000 control channels and then tunes back to the IS-856 frequency to resume the active data session. In the dormant/idle IS-856 mode, the terminal operates in a slotted manner to monitor both the IS-856 control channel and the IS-2000 control channels.

Further, because IS-856 is typically provided as an overlay on an existing IS-2000 system, it is possible that a hybrid terminal may need to hand off from a hybrid sector (providing both IS-2000 and IS-856 coverage) to an IS-2000 sector providing no IS-856 coverage), e.g., as it moves physically out of a hybrid sector and into an IS-2000 sector. To be able to facilitate such a handoff, when a hybrid terminal is operating in IS-856 it will simultaneously maintain an IS-2000 active set (as will the IS-2000 BSC) as described above. In particular, as the terminal periodically tunes to the IS-2000 frequency, it will monitor the IS-2000 pilots, consider the various threshold parameters described above, send PSMM messages as applicable to the IS-2000 BSC, and receive HDM messages as applicable from the IS-2000 BSC. Thus, when the terminal seeks to hand off from IS-856 to IS-2000, the terminal can readily switch over to operating on one or more of the sectors currently in its IS-2000 active set.

In a hybrid system, handoff from IS-856 to IS-2000 is generally triggered by an analysis of power the C/I ratios of the available IS-856 sectors. In particular, a hybrid terminal will, as noted above, regularly monitor the C/I of available sectors. If the terminal detects that the lowest available C/I is lower than a threshold "PILOT-DROP" level, then the terminal will leave the IS-856 system and begin operating in the IS-2000 system.

If this IS-856 to IS-2000 handoff occurs when the terminal is in an idle/dormant IS-856 mode, then the terminal will simply register in the IS-2000 system and drop its IS-856 radio link. That is, the terminal may request packet data connectivity in the IS-2000 system and consequently obtain an IS-2000 radio link. Further, because the same PDSN and mobile-IP home agent likely serves both the IS-2000 and IS-856 systems, the terminal may simply maintain its existing PPP session and mobile-IP address. As one way to accomplish this in practice, when the terminal acquires an IS-2000 radio link and sends a MIP RRQ to the PDSN, the terminal can include its already-assigned mobile-IP address within the MIP RRQ. When the PDSN receives the MIP RRQ and detects that the terminal already has a mobile-IP address, the PDSN would forego sending the MIP RRQ to HA 28. Instead, the PDSN would responsively work with the IS-2000 BSC (e.g., a packet control function (PCF) of the BSC) to set up a new radio-packet (R-P) tunnel for the IS-2000 connection and would tear down the R-P tunnel that it had with the IS-856 BSC (PCF).

If the IS-856 to IS-2000 handoff occurs when the terminal is in an active IS-856 mode, on the other hand, the terminal will first switch to an IS-856 dormant mode and will then acquire dedicated packet-data connectivity in the IS-2000 system in the manner described in the preceding paragraph.

It is also possible that a hybrid terminal operating on an IS-2000 system may hand off from an IS-2000 sector to a hybrid sector. In this regard, when a hybrid terminal is in an idle/dormant IS-2000 state, the terminal will perform periodic off-frequency searches in an effort to discover existing IS-856 systems. If the terminal thereby finds an IS-856 system, it will acquire IS-856 packet-data connectivity and then operate in the IS-856 system as described above. Existing standards generally do not permit a hybrid terminal that is in an active IS-2000 mode to hand off to IS-856, mainly because, in the active IS-2000 mode, no provision is made for discovering co-existing IS-856 systems. However, once the terminal switches to an IS-2000 dormant mode, it may then lock onto an IS-856 system as described above.

When in an idle IS-2000 mode, if a hybrid terminal locks onto an IS-856 system and acquires packet-data connectivity, the terminal will apply the conventional packet-data connection process, including acquiring an IS-856 radio link, and a PPP link and IP address. When in a dormant IS-2000 mode, the terminal will also apply the conventional packet-data connection process, but, as with a handoff from IS-856 to IS-2000, the terminal may only need to acquire an IS-856 radio link, as the PDSN may recognize that the terminal already has an assigned IP address.

5. DATA-RATE BASED VERTICAL HANDOFF

Figure 3:
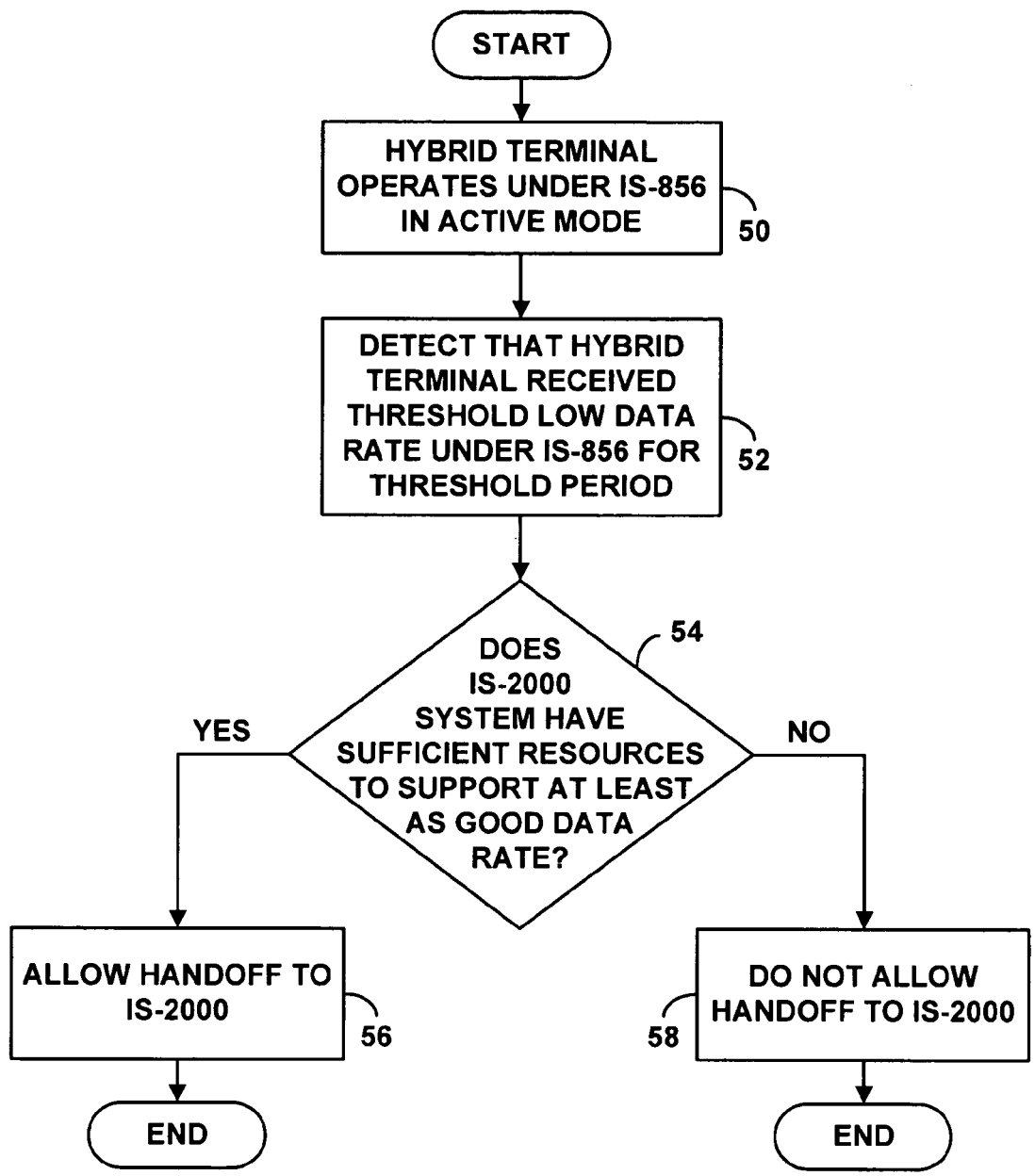
FIG. 3 is a flow chart depicting functions that can be carried out in accordance with the exemplary embodiment.

As noted above, the present invention advances over the state of the art by using data rate (possibly among one or more other parameters) as a basis to allow or deny a vertical handoff. FIG. 3 is a flow chart depicting operation of an exemplary embodiment of the invention in relation to handoff from IS-856 to IS-2000 by way of example.

At step 50, the example process begins with a hybrid terminal operating under IS-856, e.g., in an active mode. At step 52, a base station (or other entity) detects that the hybrid terminal has received a threshold low forward link IS-856 data rate for a threshold time period. In response, at step 54, the base station evaluates the IS-2000 system to determine if the IS-2000 system has sufficient resources to provide at least as good data rate as the terminal is getting (or has received) under IS-856. If the base station thereby determines that the IS-2000 system is a good alternative, then, at step 56, the base station will allow a handoff to occur when the terminal seeks to handoff to IS-2000. On the other hand, if the base station thereby determines that the IS-2000 system is not a good alternative (i.e., it cannot support at least the same data rate that the IS-856 system is currently providing), then, at step 58, the base station will not allow the handoff to IS-2000 when the terminal seeks such handoff.

As shown by the flow chart, the process of determining whether to allow handoff from IS-856 to IS-2000 can be carried out in advance of a the hybrid terminal requesting such handoff. While that is the preferred embodiment, it is also possible that the process of determining whether to allow the handoff can be carried out in response to the hybrid terminal requesting the handoff. For instance, once the base station receives a handoff request, the base station may then analyze its records to determine what data rate was provided to the terminal under IS-856 over a past designated time period (e.g., the dwell period) and may then determine whether IS-2000 can support at least that same data rate.

The following sections will discuss each of these exemplary process steps of FIG. 3 in more detail. As noted above, however, it should be understood that variations on these steps and on the process as a whole are possible within the scope of the claimed invention.

a. Detect Threshold Low Data Rate Condition Under Current Protocol

In a preferred embodiment, the base station will first detect that a hybrid terminal's forward link data rate under IS-856 falls below a designated data rate threshold. To carry out this function, the base station will regularly monitor the amount of data the base station is transmitting per unit time to the terminal, e.g., as a rolling average. (As noted above, under IS-856, this forward link data rate could vary somewhat from the data rate that the terminal requested.) Further, the base station will regularly compare this rolling average data rate to the predefined threshold, to determine when the data rate is lower than the threshold.

The data rate threshold can be set in various ways. In a preferred embodiment, for instance, the data rate can be set by optimization on a sector by sector basis, such as by analyzing actual use over time in a sector and using the average actual use as a basis to set the threshold data rate for the sector. As a specific example, the data rate threshold might be set at 76.8 kbps, or 38 kbps. Other examples are possible as well.

In response to detecting that a terminal's forward link data rate is lower than the data rate threshold, the base station will then preferably begin decrementing a dwell timer set at some predefined time period. (The specific time period is a matter of design choice.) If the terminal's forward link data rate remains below the data rate threshold for the entire dwell period (possibly allowing for some hysterisis to account for brief movements above the threshold), then the base station proceeds to the next step. Alternatively, if the terminal's forward link data rate rises above the threshold, the process may end.

The main purpose of waiting for the terminal's forward link data rate to remain below the data rate threshold for the dwell period is to ensure that the terminal is in fact experiencing a low data rate condition. Other ways to draw this conclusion include determining that the terminal's forward link data rate was below the threshold for a threshold percentage of the dwell period, or a certain number of times during the dwell period. Further, while the preferred embodiment focuses on forward link data rate, it should be understood that reverse link data rate could be considered instead of, or in addition to, forward link data rate.

b. Evaluate Whether Sufficient Data Rate can be Provided Under Target Protocol

Once the base station has determined that the terminal's forward link data rate remained below the data rate threshold for a sufficient period of time, the base station will next preferably analyze the IS-2000 system to determine whether the IS-2000 system has sufficient resources available to support at least a desired forward link data rate. In the preferred embodiment, the desired forward link data rate is the IS-856 threshold data rate. In an alternative embodiment, however, the desired forward link data rate could be a rate that is higher than the threshold data rate. Still alternatively, the desired forward link data rate could be any designated (e.g., operator defined) data rate, so that the base station would determine whether the IS-2000 system can support at least that designated data rate.

In a preferred embodiment, the function of checking for sufficient IS-2000 resources to support at least a desired data rate will involve (i) determining if the IS-2000 system has a sufficient number of Walsh codes available to provide at least the desired data rate, (ii) determining if the IS-2000 system has sufficient power available to provide at least the desired data rate, (iii) determining if the IS-2000 system has sufficient channel elements available to provide at least the desired data rate, and/or (iv) determining if the IS-2000 system has sufficient number of packet-pipes to support at least the desired data rate.

Preferably, the base station will conclude that the IS-2000 system can support a sufficient data rate to justify a handoff only if at least the first three of these determinations are made, and the base station will otherwise conclude that the IS-2000 system cannot support a sufficient data rate to justify the handoff. However, the base station may alternatively condition its conclusion one any one or more of these or other determinations.

In the preferred embodiment, the first determination the base station will make is, for each sector in the terminal's IS-2000 active set, whether the sector has a sufficient number of Walsh codes available to support at least the IS-856 threshold data rate. In this regard, an IS-2000 sector can support various discrete data rates by carrying data on a fundamental traffic channel and perhaps one or more supplemental traffic channels. The fundamental channel uses one Walsh code, and each supplemental channel uses one or more Walsh codes. In particular, under RC3, (i) a data rate of 38.4 kbps requires the fundamental channel Walsh code plus 4 supplemental channel Walsh codes, (ii) a data rate of 76.8 kbps requires the fundamental channel Walsh code plus 8 supplemental channel Walsh codes, and (iii) a data rate of 153.6 kbps requires the fundamental channel Walsh code plus 16 supplemental channel Walsh codes. (Under RC4, half this many Walsh codes are needed.) Given the threshold IS-856 data rate, the base station can thus determine for each sector in the terminal's active set if a sufficient number of available (currently unused) Walsh codes exist to support at least that data rate.

For example, if the IS-856 threshold data rate is 100 kbps, then the base station may evaluate each sector in the terminal's active set to determine if the sector has at least 17 available Walsh codes, in order to provide a rate that is at least 100 kbps—namely, the next quantum data rate available with Walsh coded channels, 153.6 kbps (with one fundamental channel Walsh code and 16 supplemental channel Walsh codes). If so, the base station will conclude that the IS-2000 sector is a candidate to serve the terminal. On the other hand, if not, the base station will conclude that the IS-2000 is not a candidate to serve the terminal.

Following this analysis for all of the sectors (if more than one) in the terminal's IS-2000 active set, if the base station concludes that at least one of the IS-2000 sectors is a candidate to serve the terminal, the base station will proceed to the next step. Otherwise, the base station will set a flag in data storage 38 indicating that the sector is not a candidate to serve the terminal, i.e., that the terminal would be better off to remain in the IS-856 system, even though the forward link data rate in the IS-856 system is undesirably low. (Such a flag can be considered to indicate directly or indirectly that an insufficient data rate is available under the target IS-2000 system, i.e., that the IS-2000 system cannot support the desired data rate.)

Next, for each IS-2000 sector that the base station concludes is a candidate to serve the terminal, the base station will preferably evaluate the available power in the sector, to determine if the sector has enough power to support the desired data rate (i.e., at least as high as the IS-856 threshold data rate). In this regard, it is well known that an IS-2000 sector allocates power dynamically to terminals that it serves. Vendor-specific power allocation algorithms are typically employed for this purpose. In the preferred embodiment, the base station may use the applicable power-allocation algorithm to determine if sufficient power amplifier (PA) power is available to support the desired data rate.

By way of example, the base station could be programmed with correlation data (set as a matter of engineering design, or set dynamically) that correlates particular data rates with particular levels of power. Given the desire to support a particular data rate, the base station can then refer to the correlation data to determine what power would be necessary or desired to support the data rate, and the base station can then determine whether the sector can allocate at least that amount of power, given the power being used currently to serve users in the sector. Through this or another analysis, if the base station concludes that the sector does not have sufficient power to support the desired data rate, then the base station will set a flag in data storage 38 indicating that the sector is not a candidate to serve the terminal.

Further, for each IS-2000 sector that the base station concludes is a candidate to serve the terminal (e.g., for each one determined to have sufficient number of available Walsh codes and a sufficient amount of power available to provide at least the IS-856 threshold data rate), the base station will determine whether the sector has a sufficient number of channel elements available to support at least the desired data rate. As is well known, channel elements are the logical components at a base station to support communications. Mechanisms can be provided to dynamically allocate channel elements, so this may be a non-issue in some instances. However, in other instances, the number of channel elements may be an equally significant consideration.

With this preferred analysis, if the base station determines that a given IS-2000 sector has sufficient power and sufficient number of channel elements, then, given that the sector also has a sufficient number of Walsh codes, the base station will set a flag in data storage 38 indicating that the sector is a candidate to serve the terminal. On the other hand, if the base station thereby determines that the sector does not have sufficient power and/or that the sector does not have a sufficient number of channel elements, then the base station will set a flag in data storage 38 indicating that the sector is not a candidate to serve the terminal, i.e., that the terminal would be better off to remain in the IS-856 system, even though the forward link data rate in the IS-856 system may be undesirably low.

c. Granting or Denying Vertical Handoff

According to the preferred embodiment, this entire process will be occurring at the base station at the same time as the terminal is conventionally evaluating the IS-856 pilot to determine whether the IS-856 pilot falls below the PILOT-DROP level. As noted above, when the terminal detects that the IS-856 pilot falls below the PILOT-DROP level, the terminal will initiate a handoff to IS-2000. In accordance with the exemplary embodiment, when the terminal seeks to perform the handoff, the base station will then use the valuable information it gleans from the inventive process to determine whether or not to allow the handoff to proceed.

In this regard, it is understood that a terminal seeking to acquire packet data connectivity under IS-2000 may first acquire a fundamental channel and may then acquire one or more supplemental channels so as to support a desired data rate; at issue in the present process may be whether the base station will allow the terminal to gain packet data connectivity under IS-2000 at all. If insufficient resources exist under IS-2000 to support the desired data rate, then the base station may preclude the handoff, even with respect to the initial acquisition of a fundamental channel. Whereas, if sufficient resources exist, then the base station may allow the handoff to occur.

Thus, in the preferred embodiment, if the base station has concluded that no IS-2000 sector in the terminal's active set can support a sufficient data rate (i.e., at least as high a data rate as the terminal is receiving under IS-856), then the base station may decline to grant the terminal's IS-2000 packet data origination request. On the other hand, if the base station has concluded that at least one IS-2000 sector in the terminal's active set can support a sufficient data rate, then the base station may grant the terminal's IS-2000 origination request. In that case, the base station may direct the terminal to operate on the IS-2000 sector that can support the highest data rate. (In systems that support communication on more than one sector at a time, the base station could direct the terminal to operate on those sectors that support the highest data rate.) The process of a base station directing a terminal to operate on a particular sector is well known and therefore not described here.

As noted above, the base station could carry out the above process of evaluating IS-2000 system resources before, during and/or after the terminal seeks to initiate a handoff to IS-2000. Preferably, however, the base station will evaluate the availability of Walsh codes, power, and channel elements within a period of 300 milliseconds to 1 second of when the terminal seeks to initiate a handoff, so that the information gleaned will be fresh and likely accurate. If more than 1 second has passed since the base station last evaluated the IS-2000 resources for the terminal, the base station may simply allow the handoff or may take some other action.

If, after this process, the terminal proceeds with handoff to the IS-2000 system, the base station can assign the traffic channels, power, and channel elements necessary to support the data that is to be transmitted to the terminal (e.g., data buffered at the base station). Similarly, the terminal can request the base station to assign traffic channels sufficient to support the desired data rate on the reverse link.

6. CONCLUSION

An exemplary embodiment of the present invention has been described above. Those skilled in the art will understand, however, that changes and modifications may be made to this embodiment without departing from the true scope and spirit of the present invention, which is defined by the claims.

We claim:

1. A method comprising:
   detecting that a hybrid wireless terminal has received a data rate below a threshold data rate while operating under a first air interface protocol; and
   conditioning handoff of the terminal from the first air interface protocol to a second air interface protocol on a determination that a desired data rate is available under the second air interface protocol,
   wherein conditioning handoff of the terminal from the first air interface protocol to a second air interface protocol on a determination that a desired data rate is available under the second air interface protocol comprises:
      making the determination that the desired data rate is available under the second air interface protocol,
      wherein making the determination that the desired data rate is available under the second air interface protocol comprises (i) determining that, under the second air interface protocol, a sufficient number of Walsh codes exist to support the desired data rate, (ii) determining that, under the second air interface protocol, sufficient radio link power exists to support the desired data rate, and (iii) determining that, under the second air interface protocol, a sufficient number of channel elements exists to support the desired data rate.

2. The method of claim 1, wherein the first air interface protocol is IS-856 and the second air interface protocol is IS-2000.

3. The method of claim 1, wherein the threshold data rate is a forward link data rate, and wherein the desired data rate is a forward link data rate.

4. The method of claim 1, wherein detecting that the terminal has received a data rate below the threshold data rate while operating under the first air interface protocol comprises detecting that the terminal has received a data rate below the threshold data rate for at least a threshold time period while operating under the first air interface protocol.

5. The method of claim 1, wherein detecting that a hybrid wireless terminal has received a data rate below the threshold data rate while operating under a first air interface protocol comprises:
   determining a given data rate at which the terminal has operated under the first air interface protocol; and
   comparing the given data rate with the threshold data rate, wherein the desired data rate is the threshold data rate.

6. In a hybrid cellular wireless communication system of the type providing both IS-2000 coverage and IS-856 coverage, wherein a base station serves a hybrid terminal that is capable of operating under IS-2000 and IS-856, a method performed by the base station comprising:
   detecting that the hybrid terminal has received an IS-856 forward link data rate less than a threshold data rate for a threshold period of time;
   responsively evaluating IS-2000 resources to make a determination of whether an IS-2000 forward link data rate of at least as high as the threshold data rate is available for the hybrid terminal;
   if the determination is that an IS-2000 forward link data rate of at least as high as the threshold data rate is available for the hybrid terminal, then allowing the hybrid terminal to hand off from IS-856 to IS-2000; and
   if the determination is that an IS-2000 forward link data rate of at least as high as the threshold data rate is not available for the hybrid terminal, then preventing the hybrid terminal from handing off from IS-856 to IS-2000.

7. The method of claim 6, wherein the hybrid terminal has an IS-2000 active set of one or more sectors, and wherein evaluating IS-2000 resources to make the determination of whether an IS-2000 forward link data rate of at least as high as the threshold data rate is available for the hybrid terminal comprises:

determining respectively for each sector in the hybrid terminal's IS-2000 active set whether the sector has a sufficient number of Walsh codes available to support a data rate of at least as high as the threshold data rate.

8. The method of claim 6, wherein the hybrid terminal has an IS-2000 active set of one or more sectors, and wherein evaluating IS-2000 resources to make the determination of whether an IS-2000 forward link data rate of at least as high as the threshold data rate is available for the hybrid terminal comprises:

determining for each sector in the hybrid terminal's IS-2000 active set whether the sector has sufficient power to support a data rate of at least as high as the threshold data rate.

9. The method of claim 6, wherein the hybrid terminal has an IS-2000 active set of one or more sectors, and wherein evaluating IS-2000 resources to make the determination of whether an IS-2000 forward link data rate of at least as high as the threshold data rate is available for the hybrid terminal comprises:

determining for each sector in the hybrid terminal's IS-2000 active set whether the sector has sufficient channel elements to support a data rate of at least as high as the threshold data rate.

10. The method of claim 6, wherein the hybrid terminal has an IS-2000 active set of one or more sectors, and wherein evaluating IS-2000 resources to make the determination of whether an IS-2000 forward link data rate of at least as high as the threshold data rate is available for the hybrid terminal comprises:

concluding that an IS-2000 forward link data rate of at least as high as the threshold data rate is available for the hybrid terminal if at least one sector in the hybrid terminal's IS-2000 active set (i) has a sufficient number of Walsh codes available to support a data rate of at least as high as the threshold data rate, (ii) has sufficient power to support a data rate of at least as high as the threshold data rate, and (iii) has a sufficient number of channel elements to support a data rate of at least as high as the threshold data rate.

11. The method of claim 10, wherein concluding that an IS-2000 forward link data rate of at least as high as the IS-856 forward link data rate is available for the hybrid terminal if at least one sector in the hybrid terminal's IS-2000 active set (i) has a sufficient number of Walsh codes available to support a data rate of at least as high as the threshold data rate, (ii) has sufficient power to support a data rate of at least as high as the threshold data rate, and (iii) has a sufficient number of channel elements to support a data rate of at least as high as the threshold data rate comprises:

determining respectively for each sector in the hybrid terminal's IS-2000 active set whether the sector has a sufficient number of Walsh codes available to support a data rate of at least as high as the threshold data rate; and for each sector, if any, determined to have a sufficient number of Walsh codes available to support a data rate of at least as high as the threshold data rate, determining whether the sector has sufficient power and channel elements to support a data rate of at least as high as the threshold data rate.

12. The method of claim 6, further comprising:

if the determination is that an IS-2000 forward link data rate of at least as high as the threshold data rate is available for the hybrid terminal, then setting a flag in data storage to indicate that an IS-2000 forward link data rate of at least as high as the threshold data rate is available for the hybrid terminal;

if the determination is that an IS-2000 forward link data rate of at least as high as the threshold data rate is not available for the hybrid terminal, then setting the flag in data storage to indicate that an IS-2000 forward link data rate of at least as high as the threshold data rate is not available for the hybrid terminal.

13. The method of claim 12, further comprising:

receiving a request from the hybrid terminal to handoff from IS-856 to IS-2000;

based on the flag, deciding whether or not to allow the requested handoff.

14. The method of claim 13, wherein:

receiving the request from the hybrid terminal to handoff from IS-856 to IS-2000 comprises receiving from the hybrid terminal an origination request seeking to originate a packet-data connection under IS-2000; and deciding whether to allow or prevent the requested handoff comprises deciding whether to grant or deny the origination request.

15. In a hybrid cellular wireless communication system of the type providing wireless communication service under at least a first air interface protocol and a second air interface protocol, wherein a base station serves a hybrid terminal that is capable of operating under the first air interface protocol and under the second air interface protocol, the improvement comprising:

means for detecting that the hybrid terminal has received a given forward link data rate less than a threshold data rate while the hybrid terminal was operating under the first air interface protocol;

means for responsively evaluating resources under the second air interface protocol to make a determination of whether at least a desired forward link data rate is available for the hybrid terminal under the second air interface protocol; and means for using the determination to decide whether or not to allow the hybrid terminal to hand off from the first air interface protocol to the second air interface protocol, wherein the first air interface protocol is IS-856 and the second air interface protocol is IS-2000, and wherein the means for responsively evaluating resources under the second air interface protocol to make a determination of whether at least a desired forward link data rate is available for the hybrid terminal under the second air interface protocol comprises means for determining whether, under the second air interface, (i) sufficient Walsh codes exist to support the desired forward link data rate, (ii) sufficient power exists to support the desired forward link data rate, and (iii) sufficient channel elements exist to support the desired forward link data rate.

16. The improvement of claim 15, wherein the improvement is disposed at least in part within the base station.

17. The improvement of claim 15, wherein the desired forward link data rate is the threshold data rate.

* * * * *